US008525847B2

(12) United States Patent
Reid et al.

(10) Patent No.: US 8,525,847 B2
(45) Date of Patent: Sep. 3, 2013

(54) ENHANCING IMAGES USING KNOWN CHARACTERISTICS OF IMAGE SUBJECTS

(75) Inventors: Russell Reid, Palo Alto, CA (US); Joshua Fagans, Redwood City, CA (US); Tim Cherna, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 857 days.

(21) Appl. No.: 12/476,181

(22) Filed: Jun. 1, 2009

(65) Prior Publication Data

US 2010/0302272 A1     Dec. 2, 2010

(51) Int. Cl.
*G09G 5/02*     (2006.01)

(52) U.S. Cl.
USPC ........... 345/589; 345/581; 345/591; 345/593; 345/604

(58) Field of Classification Search
USPC ................. 382/118, 101, 171; 348/570, 649; 235/383
See application file for complete search history.

(56) References Cited

U.S. PATENT DOCUMENTS

| | | | |
|---|---|---|---|
| 6,728,401 B1 | 4/2004 | Hardeberg | |
| 7,450,753 B2 * | 11/2008 | Hayaishi | 382/167 |
| 2002/0110282 A1 * | 8/2002 | Kraft et al. | 382/261 |
| 2003/0012414 A1 * | 1/2003 | Luo | 382/118 |
| 2004/0017938 A1 * | 1/2004 | Cooper et al. | 382/171 |
| 2006/0176400 A1 * | 8/2006 | Shimizu | 348/570 |
| 2006/0193494 A1 * | 8/2006 | Toyama | 382/103 |
| 2007/0065006 A1 | 3/2007 | Wilensky | |
| 2008/0031490 A1 * | 2/2008 | Kobayashi | 382/101 |
| 2008/0095445 A1 | 4/2008 | Brandt | |
| 2008/0181468 A1 * | 7/2008 | Oosaki | 382/118 |
| 2008/0245862 A1 * | 10/2008 | Dennard et al. | 235/383 |
| 2009/0046326 A1 * | 2/2009 | Nakajo et al. | 358/448 |
| 2009/0267893 A1 * | 10/2009 | Kato et al. | 345/156 |
| 2009/0290068 A1 * | 11/2009 | Abe et al. | 348/649 |
| 2010/0054549 A1 * | 3/2010 | Steinberg et al. | 382/118 |
| 2010/0303345 A1 | 12/2010 | Reid et al. | |

* cited by examiner

*Primary Examiner* — Xiao Wu
*Assistant Examiner* — Phi Hoang
(74) *Attorney, Agent, or Firm* — Wong, Cabello, Lutsch, Rutherford & Brucculeri LLP

(57) ABSTRACT

A method performed by one or more computers programmed to enhance images, the method including receiving an image and a face region associated with the image, sampling pixels from the face region, generating, based on the sampled pixels, a face-region evaluation, identifying a modification to the image based on the face-region evaluation, and modifying the image in accordance with the identified modification.

24 Claims, 6 Drawing Sheets

ENHANCING IMAGES USING KNOWN CHARACTERISTICS OF IMAGE SUBJECTS

TECHNICAL FIELD

The present disclosure relates to enhancing images, such as to improve images aesthetically, using known characteristics of image subjects.

BACKGROUND

Photography is a popular pastime. Images, including digital images, can be created and manipulated using digital cameras, scanners, video equipment and image editing software. Images can be analyzed and modified in a variety of ways.

Images representing people often include substantial facial detail of the people represented. Facial detection involves determining whether images represent one or more faces. Facial detection also can involve determining in which portion of an image a face is represented, where particular features (e.g., eyes or a mouth) of the face are located, and the angle of the face relative to the overall image. Some facial detection processes focus on detection of frontal human faces. Other facial detection processes attempt to detect faces that are either rotated along the axis from the face to the observer (in-plane rotation), or rotated along the vertical or left-right axis (out-of-plane rotation), or both.

Image enhancement includes modifying characteristics of an image to potentially improve the appearance of the image. For example, an image can be enhanced by setting the black point of the image. The points of an image (e.g., pixels) can represent a range of colors. Setting the black point involves adjusting the range of colors so that at least some points are pure black. Similarly, setting a white point involves adjusting the colors of an image so that at least some points are pure white.

Image enhancement can result in clipping. Clipping includes modifying a range of colors such that some portion of the resulting range lies outside the limits of the medium. For example, pixel values of a grayscale image may be limited to values between 0 (pure black) and 255 (pure white) by an image format (e.g., the Portable Network Graphics (PNG) format). If one or more of an image's pixels have values of 255, further brightening of these pixels cannot be represented by the image format since the pixels are already at the maximum possible value. In addition, through the brightening operation image information can be lost as pixels with values near 255 are increased to 255 and become indistinguishable from the existing pixels with values of 255.

Images also can be enhanced by adjusting levels of saturation, contrast, color temperature and tint, exposure, definition, sharpness and other image characteristics. Saturation can refer to various concepts but generally refers to the intensity and purity of color relative to black, white or gray. Approximations of true color saturation can be employed as part of image enhancement.

SUMMARY

This disclosure describes technologies and techniques for enhancing images using known characteristics of image subjects.

A facial detection system or application can provide an indication that a face is believed to be represented in an image or a portion of an image. The present inventors recognized a need to account for characteristics of faces represented in an image during image enhancement. In addition, the present inventors recognized a need to enhance an image using inferences derived from the knowledge that an image represents a face and an analysis of the characteristics of the represented face. Additionally, the need to determine whether an image is too bright and should be darkened, or too dark and should be lightened, was recognized. Further, the need to avoid detrimentally altering represented faces during image enhancement was recognized. For example, detrimental alterations can include making represented faces appear washed out, too dark to permit facial features to be readily perceived, or colored unnaturally such that skin does not appear the same color as the represented face. Additionally, the need to facilitate enhancement of images in a manner consistent with user expectations and intentions, such as to maintain and improve the appearance of faces in images, was recognized.

In general, one aspect of the subject matter described in this specification can be implemented in a method performed by one or more computers programmed to enhance images. The method can include receiving an image and a face region associated with the image; sampling pixels from the face region; generating, based on the sampled pixels, a face-region evaluation; identifying a modification to the image based on the face-region evaluation; and modifying the image in accordance with the identified modification. Aspects of the subject matter also can be implemented in systems, computer program products, and related processes and apparatus.

These and other implementations can optionally include one or more of the following features. The image can include an overall image and the face region can include a face image that is separate from the overall image. The method can further include sampling pixels from the image; and generating, based on the sampling of the image, an overall evaluation of the image. Identifying the modification can include identifying based on the overall evaluation and the face-region evaluation. The face-region evaluation and the overall evaluation can include histograms. The histograms can correspond to luminosity, saturation and brightest color component of the image and the face region. Generating the face-region evaluation can include converting the sampled pixels to a normalized red-green color space; and calculating the mean color of the converted pixels. Modifying the image further can include adjusting the image, based on the mean color, such that a hue component of the mean color is centered in a range of accepted face colors.

The techniques described in this specification can be implemented to realize one or more of the following advantages. In general, the presence of a human face (or "face") in an image can be used to improve image enhancement over enhancement performed without reference to facial information. For example, adjustments to images can be limited so that the adjustments do not degrade represented faces. Furthermore, analysis of a region of an image known to represent a face can provide a basis to determine the probable brightness and color of incident light at the time an image was captured. Information about incident light can be used to establish the subjective lightness, darkness, color saturation and other characteristics of an image thereby facilitating image enhancement tailored to the particular defects of the image. For example, information about incident light provided through analysis of a represented face can be used to distinguish between a dimly lit white wall that should be brightened and a gray wall that is brightly lit and should not be brightened. Similarly, information about incident light can be used to distinguish between a blue wall lit with a red light and a red wall lit with a blue light.

The details of one or more implementations are set forth in the accompanying drawings and the description below. Other features and advantages will be apparent from the description and drawings, and from the claims.

BRIEF DESCRIPTION OF THE DRAWINGS

Like reference symbols indicate like elements throughout the specification and drawings.

DETAILED DESCRIPTION

Enhancing images involves improving images aesthetically. For many image characteristics, there are wide ranges of accepted values. For example, darkness in an image can be acceptable until the darkness reaches a level at which a person cannot make out the image details. Brightness in an image also can be acceptable until details become washed out.

Knowing that a portion of an image represents a face and analyzing the portion can provide a basis for analysis of the overall image because faces have known characteristics. For example, human faces exhibit a particular range of skin tone colors relative to the overall color spectrum. Knowing that the colors represented in a facial region of an image should fall within the range can provide a limitation on adjustments to the overall image (e.g., to keep the colors within the range) as well as a basis for determining what adjustments to make (e.g., to move the colors into the range).

In addition, that a region of an image represents a face can provide information about the lighting conditions when the image was captured. For example, a facial region of an image can be analyzed. Given the known characteristics of human faces (e.g., the range of colors represented), inferences can be made, based on the results of the analysis, about lighting conditions affecting the overall image. Information about the lighting conditions can be used to determine whether, e.g., the tint, luminosity or saturation of an image should be adjusted. For example, an image captured of dark subject matter (e.g., black rock) with bright incident light can be distinguished from another image of light subject matter (e.g., white sand) which appears dark in the image because of being captured with low levels of incident light.

Images representing people present a particular challenge for image enhancement. For example, a relatively narrow range of skin tones is considered to provide a natural appearance. If an image is modified to enhance the depiction of a mountain or ocean, a person represented in the same image may appear unnatural after the enhancement. Thus, an image enhancement process can be configured to evaluate not only the overall characteristics of an image, but also the specific characteristics of one or more faces represented in the image.

Figure 1:
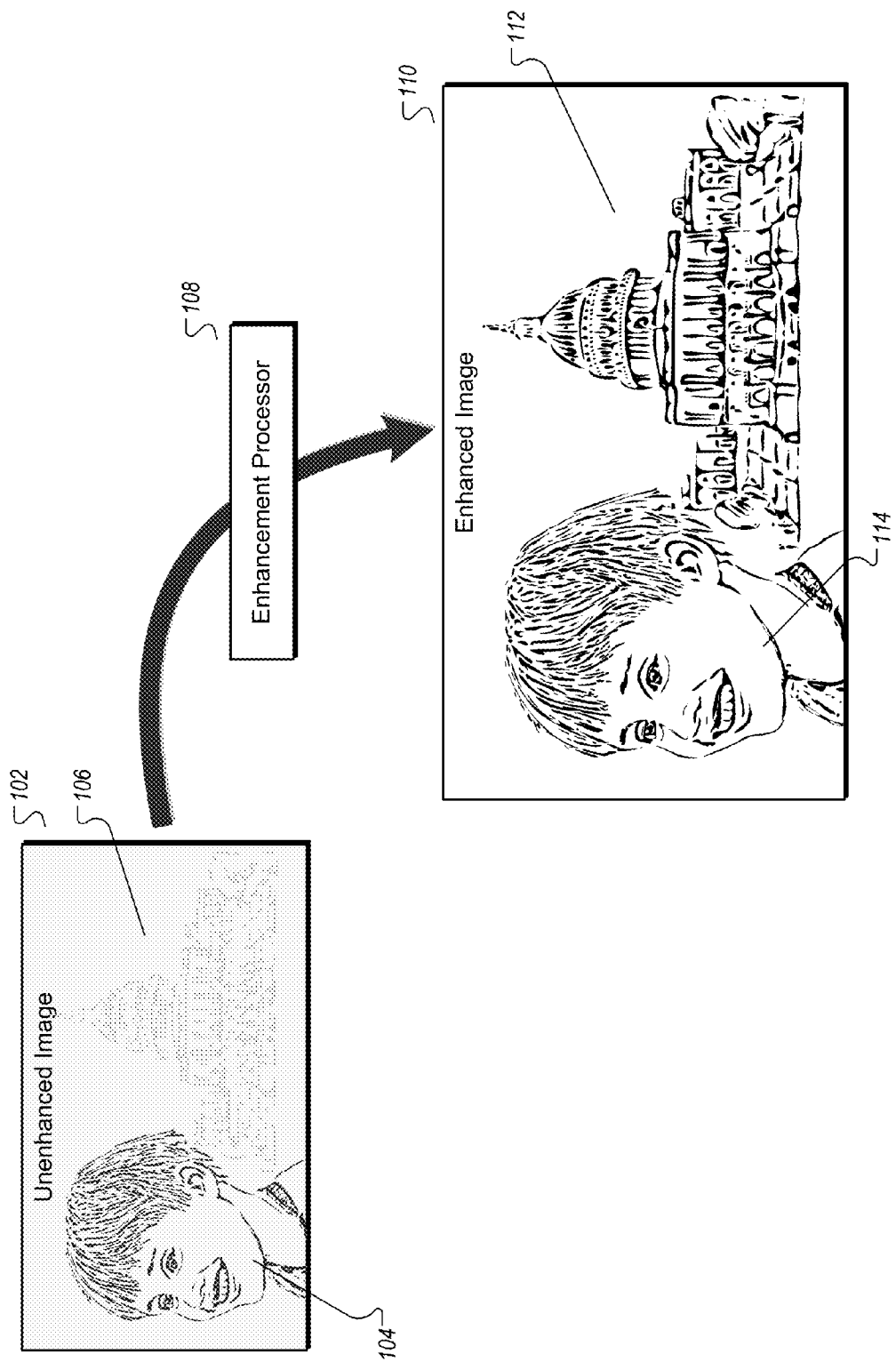
FIG. 1 shows an exemplary image enhancement process.

FIG. 1 shows an exemplary image enhancement process that can alter an image by correcting one or more aspects of the image for which values fall outside of an acceptable range. For example, an image may be underexposed and thus appear dark. If the image was created by a camera using a flash, foreground elements of the image that are closest to the flash can appear too bright relative to the background. Alternatively, the foreground elements may be properly exposed while the background appears too dark. Often such images include one or more faces. As a result, a face can appear too bright, or the face can appear properly exposed yet the background is too dark relative to the face. Brightening the entire image as part of an image enhancement process can result in the face appearing too bright or even pure white. Also, the brightening can cause clipping, or loss of image data, resulting from the image data exceeding the capabilities of a display (e.g., a computer monitor) or an image storage format (e.g., the format of the Joint Photographic Experts Group (JPEG)). Taking into account the particular characteristics of a face represented in an image can improve the overall quality of an enhanced image and reduce the likelihood of clipping.

FIG. 1 depicts an unenhanced image 102, which includes a face 104 and the United States Capital Building 106. The unenhanced image 102 contains a visual defect because the "black point" of the image is not properly set. In other words, no portion of the unenhanced image 102 is pure black. Further, the unenhanced image 102 also contains a visual defect because the "white point" of the image is not properly set. No portion of the unenhanced image 102 appears pure white. In addition, the exposure of the face 104 is not consistent with the exposure of Capital Building 106. In the unenhanced image 102, the face 104 appears significantly darker than the Capital Building 106.

An enhancement processor 108 can be configured to produce an enhanced image 110 from the unenhanced image 102. In order to produce the enhanced image 110, the enhancement processor 108 can take into account one or more characteristics of the face 104 represented in the unenhanced image 102. In some implementations, the enhancement processor 108 can receive information about whether an image represents one or more faces and which portions of the image contain the representations. In other implementations, the enhancement processor receives an unenhanced image 102 and one or more images corresponding to a face represented in the unenhanced image 102 (e.g., the face 104).

The enhancement processor 108 can use data characterizing the face 104 represented in the unenhanced image 102 as part of the enhancement process. For example, the enhancement processor 108 can sample the unenhanced image 102 and build histograms for levels of luminosity, saturation, brightest color component (i.e., maximum color), and darkest color component (i.e., minimum color). The enhancement processor 108, in addition, can analyze the face 104 and build a corresponding facial histogram for luminosity, saturation, and brightest color component. The enhancement processor 108 also can build cumulative histograms for luminosity and brightest color for the entire image 102 as well as for the face 104. For images including multiple faces, the enhancement processor 108 can create a composite of the faces for use in building the facial histogram and the cumulative histograms.

Further, the enhancement processor 108 can convert the samples of the face 104 into a new color space (e.g., red-green (R-G) color space) and calculate the mean of the face-sampled pixels in the new color space.

Additionally, the enhancement processor 108 can use the histograms built relative to the unenhanced image 102 to implement one or more enhancements. For example, using the histograms, the enhancement processor 108 can set the black point, white point, exposure, and saturation of the image. The enhancement process 108 also can use the histograms to brighten dark or "shadow" areas relative to the rest of the image. In addition, the enhancement processor 108 can use the calculated mean of the face 104 to set the color temperature and tint.

As a result of the image enhancement process, the enhancement processor 108 can produce the enhanced image 110. The enhanced image 110 can represent the same details as the unenhanced image 102, including an enhanced face 114 and the enhanced Capital Building 112. However, the enhanced image 110 is characterized by a properly set black point, since one or more portions of the enhanced image 110 are black. In addition, the white point of the enhanced image 110 also is properly set, since one or more portions of the enhanced image 110 are white. Further, the enhanced face 114 and the enhanced Capital Building 112 have similar brightness and exposure levels, such that both are clearly represented in the image.

Figure 2:
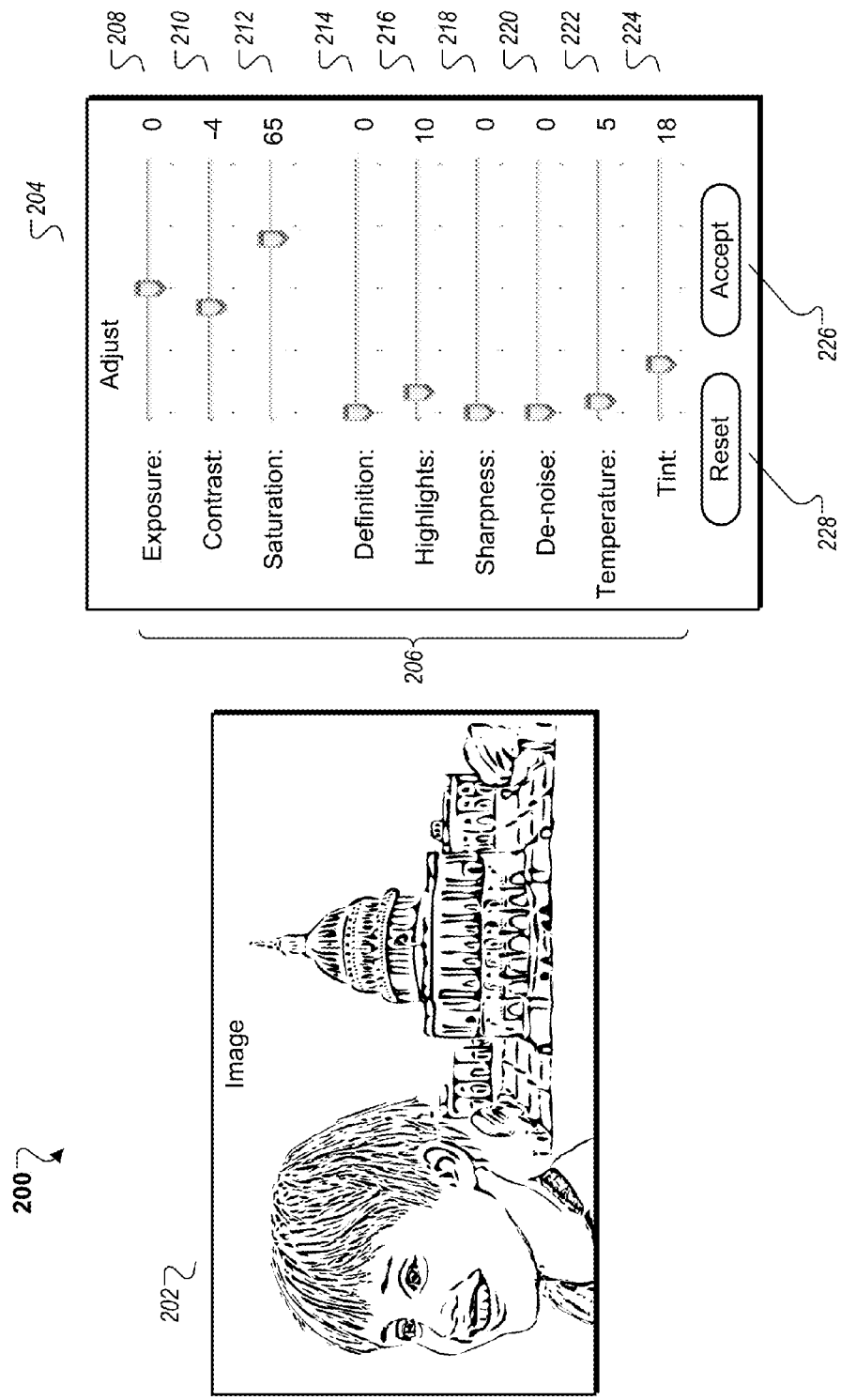
FIG. 2 shows an exemplary user interface for enhancing images.

Although the enhancement processor 108 can be configured to enhance images without user input, in some implementations, the enhancement processor 108 can provide one or more recommended settings that a user can accept, modify, or reject. As shown in FIG. 2, an image editing application can provide a user interface for communicating recommended changes and enabling the user to adjust one or more image settings.

FIG. 2 shows an exemplary user interface 200 for enhancing images. Through the interface 200, a user can edit an image 202. In some implementations, a preview of adjustments can be presented (e.g., relative to image 202 in the interface). A dialog box 204 can be configured to receive input adjustments, such as through sliders 208-224, before the adjustments are finally accepted (e.g., with the "Accept" button 226).

Through the dialog box 204, various adjustments 206 to image characteristics 206 can be made simultaneously. An exemplary group of image characteristics 206 that can be adjusted can include sliders for exposure 208, contrast 210, saturation 212, definition 214, highlights 216, sharpness 218, de-noise 220, temperature 222, and tint 224. In other implementations, different control mechanisms can be associated with one or more of the image characteristics, such as text boxes or arrows. In addition, a user can provide input to reset 228 or accept 226 the one or more adjustments pending in the dialog box.

In other implementations, input can be received using different interface mechanisms. In some implementations using sliders corresponding to the image characteristics 206, movement of a slider to the right can increase the amount of an adjustment and moving the slider to the left can decrease the amount of the adjustment. Some sliders can have a base position (e.g., a zero position) in the middle of the slider. For example, the exposure slider 208 is zero when the slider is centered from left to right. Other sliders, such as the definition slider 214, can have a base position in the far left slider position or the far right slider position. In some implementations, adjustments for which only positive adjustment values are possible can have a base position on the left (e.g., sharpness 218).

Figure 3:
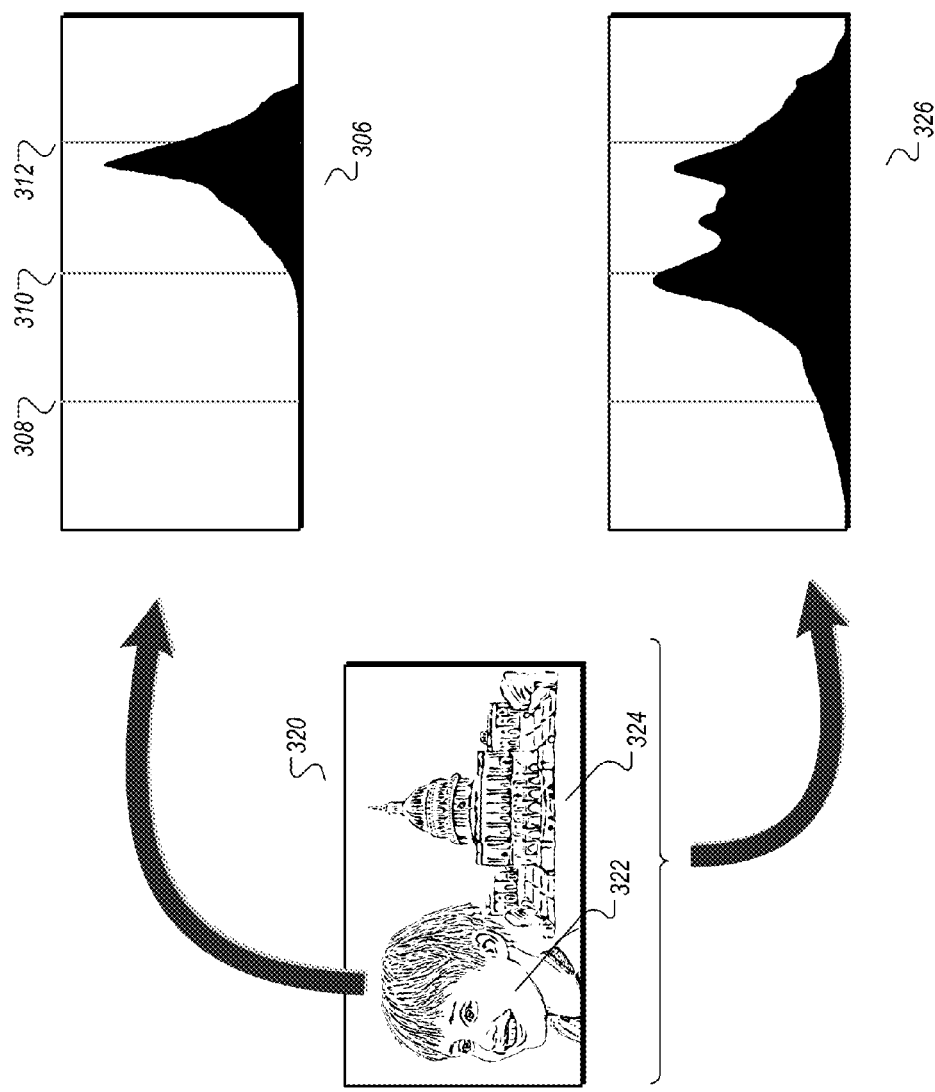
FIG. 3 is an exemplary image and corresponding face histogram and complete histogram.

FIG. 3 depicts an exemplary overall image 320 and a corresponding face histogram 306 and overall histogram 326. The overall image 320 includes a face region 322. The face region 322 can be extracted from the overall image 320 to generate the face histogram 306. In some implementations, the face region 322 can be a sample portion of a face rather than an entire face (see FIG. 4).

A histogram, such as the face histogram 306, can represent the distribution of a characteristic of an image. In other words, a histogram represents the relative amounts of image data corresponding to the possible levels of the characteristic. For example, a histogram can represent the distribution of pixels having luminosity (e.g., the combined intensity of all color components) ranging from pure black to pure white. Histograms also can represent other characteristics such as the intensity of a color component (e.g., red), saturation, a brightest color component, or a darkest color component.

The face histogram 306 represents a luminosity distribution in which the image's color components (e.g., red, green and blue) are combined into a single value. The face histogram 306 can correspond to the face region 322 of the overall image 320. The face histogram 306 can represent increasingly bright intensity levels from left to right. In other words, the relative number of pure black pixels is represented at the left edge of the face histogram 306 while the relative number of pure white pixels is represented at the right edge of the face histogram 306. The marks 308, 310 and 312 each correspond to a portion of the value space. For example, if the histogram is based on a scale of 0-255, from left to right, the mark 308 can represent a value of approximately 64. The face histogram 306 depicts that the face region 322 includes the greatest number of pixels having intensity near the mark 312. The face histogram 306 also depicts that the face region 322 has no pixels which are very dark, such as in the mark 308 portion of the histogram, and no pure white pixels, which would appear near the right edge of the face histogram 306.

Unlike the face histogram 306, which incorporates information from the face region 322 only, the overall histogram 326 incorporates information from the overall image 320, including the Capital Building 324. Comparing the face histogram 306 to the overall histogram 326 demonstrates that the overall image 320 includes significantly more pixels having luminosity values toward the middle portion and dark end of the overall histogram 326 than the face region 322 alone.

By evaluating the overall histogram 326, an image enhancement process can identify modifications to the overall image 320. By examining the face histogram 306 of the face region 322, an image enhancement process can avoid undesirably altering the appearance of the face region 322 during enhancement. This can be accomplished by ensuring that adjustments to the overall image 320 maintain the characteristics of the face region 322 within acceptable ranges. Acceptable ranges can be predetermined based on empirical evaluations of aesthetically appealing images, widely accepted standards, or settings related to an image enhancement process. For example, a range of exposure levels and saturation levels can be determined to be aesthetically appealing in relation to faces (e.g., not too light or too dark, and not overly saturated). If an adjustment being considered as part of an image enhancement process moves the face region 322 outside the acceptable range for a given characteristic, the face histogram 306 can be used to identify the defective adjustment.

Figure 4:
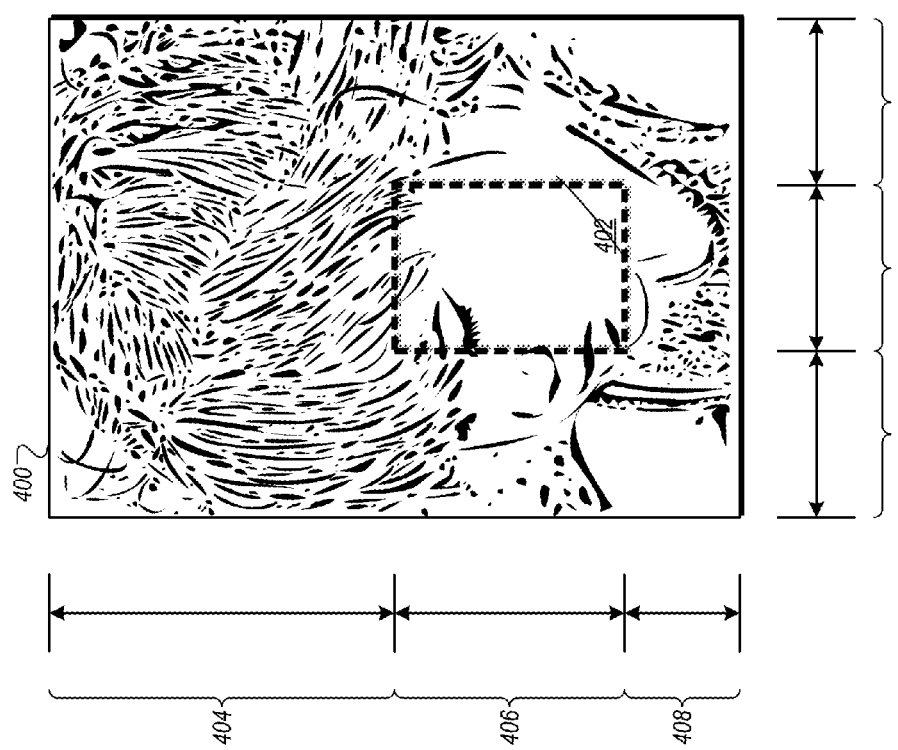
FIG. 4 is a diagram showing an exemplary extraction of a sample from an image.

In general, as shown in FIG. 4, a sampled portion from an image can be used in detecting skin tone. Images of faces can include skin tone elements (e.g., skin of a face) and non-skin tone elements (e.g., hair, hats, sunglasses, clothing, foliage, etc.). Using a portion of an image for skin tone detection can improve the detection accuracy by maximizing skin tone elements while minimizing non-skin tone elements.

FIG. 4 is a diagram showing an exemplary extraction of a sample 402 from an image 400. The image 400 represents a face of a young girl. An image enhancement process can include analyzing the image 400 to improve the enhancement of a larger image from which the image 400 was extracted. Even in a situation where a facial detection process accurately detects a face in an image and provides the portion of the image representing the face, such as the image 400, the image can include non-face elements (e.g., clothing or foliage). An image enhancement process, by including non-face elements in the analysis, can enhance the image based in part on the non-face elements. As a result, the enhancement can produce inferior results as compared to an enhancement based on analyzing a portion of the image 400 substantially or entirely representing a face. Thus, the performance of the image enhancement process can potentially be improved by selecting a sample portion 402 from the image 400 that will be more likely to include pixels representing a face.

In some implementations, a facial detection process provides a rectangular image, such as the image 400, or coordinates of a rectangular region of a larger image (not shown) to the image enhancement process. In other implementations, a facial detection process can provide polygonal shaped images or coordinates of polygonal-shaped regions. In still other implementations, a facial detection process can provide circular shaped images or coordinates of circular shaped regions. In the implementations, the image enhancement process can analyze a rectangular sample portion 402 of the image 400, a polygonal-shaped portion (e.g., a triangular) or a portion having another shape (e.g., circular). FIG. 4 represents an implementation in which the image 400 and the sample portion 402 are both rectangular.

The sample portion 402 can have the same aspect ratio as the image 400. The sample portion 402 also can have a fixed aspect ratio (e.g., 3:4) irrespective of the aspect ratio of the image 400. The sample portion 402 can be sized proportionately to the image 400. For example, the width 412 of the sample portion 402 can be a quarter or third of the width of the image 400. Similarly, the height 406 of the sample portion 402 can be a quarter or third of the height of the image 400. The proportion of the width 412 of the sample portion 402 relative to the image 400 can be the same or different than the proportion of the height 406 of the sample portion 402 relative to the image 400. Alternatively, the size and shape of the sample portion 402 can depend on other characteristics of the image 400. For example, the shape of the sample portion 402 can correspond to a two-dimensional projection of a rectangle rotated in three-dimensional space according to the angle of a face depicted in the image 400. The sample portion 402, despite wide variations in lighting, face angle, size, and non-facial image elements (e.g., hats, sunglasses and backgrounds), can potentially consistently include pixels corresponding to skin tone colors of a face.

In an exemplary implementation, the sample portion 402 can be positioned horizontally approximately in the center of the image 400. The distance 410 from the left edge of the image 400 to the left edge of the sample portion 402 can be approximately equal to the width 412 of the sample portion and the distance 414 from the right edge of the sample portion 402 to the right edge of the image 400. The sample portion 402 also can be positioned vertically approximately in the center of the image 400 (not shown). In such a case, the distance 404 from the top edge of the image 400 to the top edge of the sample portion 402 can be approximately equal to the height 406 of the sample portion 402 and the distance 408 from the bottom edge of the sample portion 402 to the bottom edge of the image 400. Alternatively, the sample portion 402 can be offset to below center such that the distance 404 from the top of sample portion 402 to the top of the image 400 is greater than the distance 408 from the bottom of the sample portion 402 to the bottom of the image 400.

Figure 5:
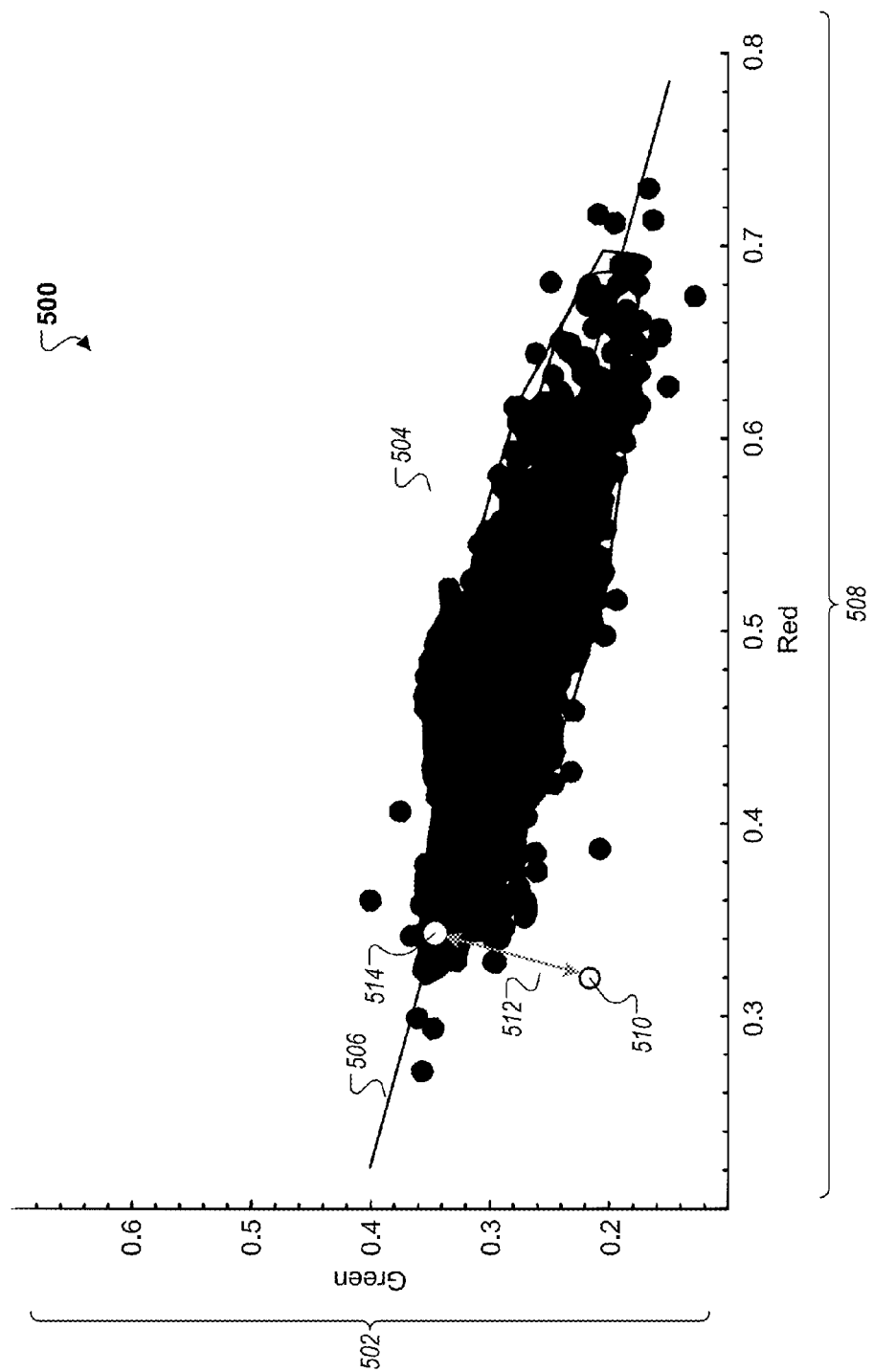
FIG. 5 is a diagram showing an exemplary skin tone region of a color space.

In general, as shown in FIG. 5, a polygonal region in a color space can represent ideal face colors. The polygonal region can be defined empirically by analyzing many images that have been adjusted for proper facial coloring. As part of enhancing an image, an image enhancement process can measure the distance in the color space between the polygonal region and the mean color of a face region of the image (e.g., the face region 322 of image 320, FIG. 3). The measurement can be used to inform adjustments to the image. For example, the image enhancement process can adjust the image so that the mean color lies with the polygonal region (e.g., centered laterally within the polygonal region at a point nearest to the original mean location).

FIG. 5 is a diagram 500 showing an exemplary skin tone region 504 of a color space. The diagram 500 can include a two-dimensional, normalized R-G color space coordinate system representation. A point on the coordinate system can represent a color in the color space. A red and a green component of the color can be represented by the location of the point. In specific, a horizontal axis 508 can correspond to a red component of a color. The distance of a point, from left to right, can indicate the intensity of the color's red component. A point near the vertical axis can have a red component of lower intensity than a point further from the vertical axis. The vertical axis 502 can correspond to a green component of a color. The distance of a point, from bottom to top, relative to the vertical axis 502 can indicate the intensity of a color's green component. The potential values of the red and green components can be normalized such that the lowest possible intensity can be indicated by 0.0 and the highest possible intensity can be indicated by 1.0. For example, a pixel can have a green component of 0.6 and a red component of 0.7 in the R-G space. A point representing the color of the pixel can be located in the upper-right corner of the diagram 500.

The skin tone region 504 can be delineated using a polygonal region in R-G space. The size and shape of the skin tone region 504 can be established empirically. For example, images can be analyzed which include face depictions that have been adjusted for proper color temperature and tint. The colors of the pixels can be stored and used to generate the skin tone region 504.

An image enhancement process can use the skin tone region 504 in setting the temperature and tint of an image. For example, the image enhancement process can calculate the mean 510 of pixels sampled from a face region of an image. The mean 510 can be converted to normalized R-G space and compared to the skin tone region 504. The target color can be set by projecting the mean 510 onto a focus-to-focus centerline 506 of the skin tone region 504 to find the point 514 on the focus-to-focus centerline 506 with the shortest distance 512 in R-G space to the mean 510 of the sampled pixels. The focus-to-focus centerline 506 can be defined by calculating or estimating the foci of the skin tone region 504. The sum of the distances between a point on the perimeter of the skin tone region 504 and the foci is approximately equal to the sum of distances for any other point on the perimeter of the skin tone region 504. The image enhancement process can adjust the image in the image's original color space so that the sampled face pixels have a new mean in R-G space equal to the point 514 found on the focus-to-focus centerline 506.

Figure 6:
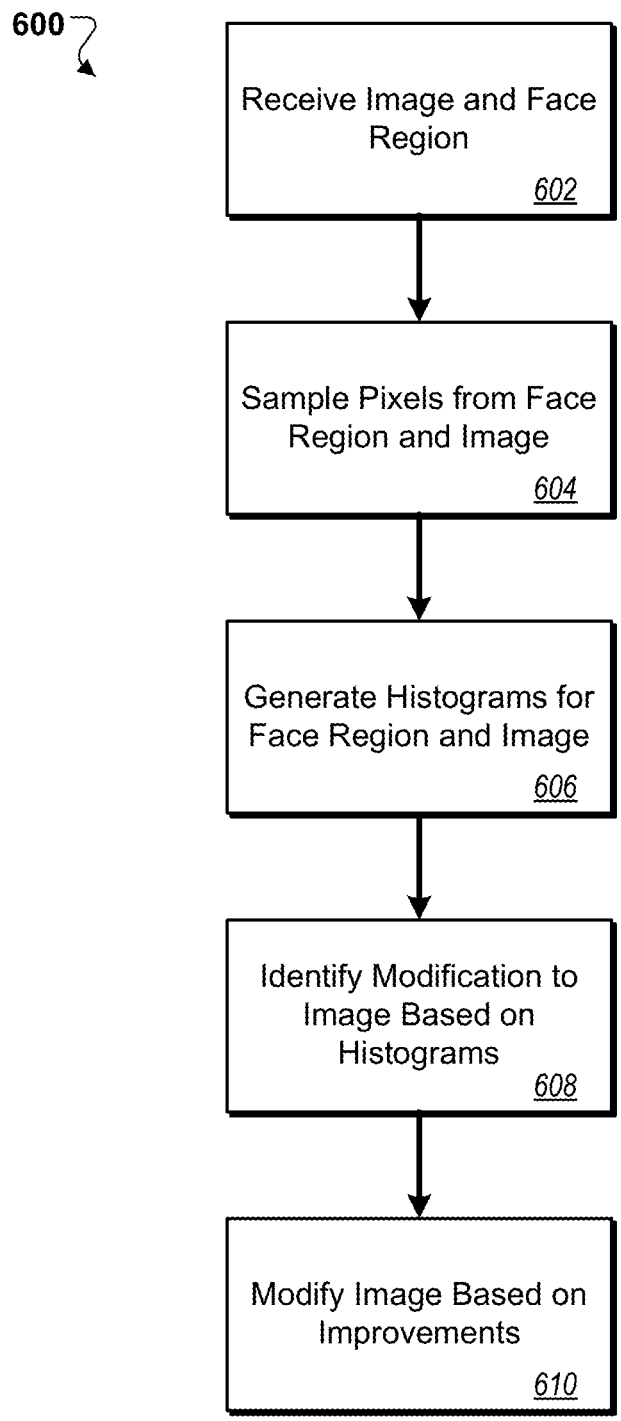
FIG. 6 is a flowchart showing an exemplary process for enhancing images.

FIG. 6 is a flowchart showing an exemplary process for enhancing images. The process 600 can be performed by a processor configured to execute a software application for enhancing images. The processor can receive (602) an image and a face region associated with the image. For example, the image can correspond to the unenhanced image 102 in FIG. 1. The face region can be a separate image depicting a face, e.g. extracted from the received image, or coordinates relative to the image where a face is located. For example, a facial detection process can determine where a face is located in the image and provide information identifying the location to the processor.

The processor can sample (604) pixels from the face region and the image. The sampling can involve examining individual pixels to determine values associated with the pixels (e.g., the intensity of color components and/or lightness). Based on the samples, the processor can generate (606) histograms for the face region and the image. The histograms can correspond to characteristics of the samples such as luminosity, saturation, brightest color component and darkest color component. In some implementations, in images including multiple faces, the process can generate (606) histograms by collectively examining all of the faces and building a composite histogram corresponding to all of the face regions. The processor, in addition, can generate (606) cumulative histograms from luminosity and brightest color component for the image and the composite face region. In other implementations, the processor can generate (606) histograms for each of the multiple faces.

The processor can identify (608) modifications to the image based on the histograms. In some implementations, the processor can analyze the histograms to detect primary, secondary and median peaks. The peaks of a histogram can identify the dominant types of information depicted in an image. For example, a luminosity histogram can have 255 bins (e.g., counts of pixels having a particular level of the characteristic represented in the histogram), where the $1^{st}$ bin represents black and the $255^{th}$ bin represents white. If the largest peak of a luminosity histogram is in the 30th bin, then the image can be too dark (e.g., having indiscernible details due to the darkness). If the largest peak is in the $220^{th}$ bin, the image can be too bright (e.g., having indiscernible details and appearing washed out due to the brightness).

Where a histogram corresponds to image data known to represent a face, the histogram peaks can be used to infer additional information. Since a range of acceptable levels of, e.g., luminosity, saturation, tint and temperature correspond to human faces, the histogram peaks can provide a basis for assessing whether adjustments should be made to an overall image and what adjustments should be made. For example, if a histogram peak shows that the blue component of colors corresponding to a face is outside the range of acceptable levels for faces, the blue component of colors for the overall image can be reduced.

In some implementations, the processor can identify (608) various types of modifications based on defects detected in the image. For example, the processor can identify (608) modifications to a black point setting based on an inappropriately set black point. The processor can examine histograms corresponding to the luminosity of the image, the luminosity of the face region, the darkest color component of the image and brightest color component of the image. In some implementations, the processor can identify the black point modification by evaluating two aspects and then combining the results. The processor can evaluate the histogram values from the darkest to the lightest until three bins have been crossed with more than the threshold number of pixels. For example, a histogram bin containing more than 0.05% of the total number of image pixels can be considered significant. The processor can examine the first bin, then the second bin, and so forth, until it has found three bins with a significant number of pixels. If the black point were set to the level of the third bin found, approximately 1.5% of the image's pixels would be pure black. In addition, the processor can consider the cumulative histogram to ensure that at least a threshold percentage of pixels is black. Based on the combined indications of each evaluation, the processor can identify (608) the modification needed relative to the black point of the image. The processor can modify (610) the image based on the identified modifications and set a new black point.

In some implementations, in order to reduce the risk of undesirable results, the processor can identify (608) a level of a particular modification believed to be appropriate but then actually modify (610) the image to a lesser degree. In addition to setting the black point of an image, modifying (610) the image can include adjusting contrast, brightness, color temperature, tint, saturation as well as other characteristics of an image. Further, modifying (610) the image can involve linear or non-linear (e.g., gamma corrected) adjustment to values of pixels of the image.

The subject matter described herein, including processes and processors, can be implemented in data processing apparatus. Data processing apparatus include various forms of digital computers, such as laptops, desktops, workstations, personal digital assistants, and other appropriate computers. Data processing apparatus can include a processor, memory, a storage device, and interfaces connecting the processor, memory and storage devices. The processor can execute instructions, including instructions stored in the memory, on the storage device, or on computer readable media, and display information on an input/output device, such as a display coupled to a computer apparatus interface.

In some implementations, multiple processors and/or multiple buses can be used, as appropriate, along with multiple memories and types of memory. Also, multiple computing devices can be connected as a single data processing apparatus, with each device potentially providing portions of the necessary processing.

The memory can be a volatile memory unit or units, or non-volatile memory unit or units. The memory can also be another computer-readable media, such as a magnetic or optical disk. The storage device can provide mass storage for data processing apparatus.

Unless stated otherwise, terms such as "processing," "computing," "calculating," "determining" or the like refer to actions or processes of data processing apparatus, such as a computer, that manipulates or transforms data represented as physical electronic or magnetic quantities within memories, registers, or other information storage devices, transmission devices, or display devices of data processing apparatus.

A number of implementations have been disclosed herein. Nevertheless, it will be understood that various modifications may be made without departing from the spirit and scope of the claims. Accordingly, other implementations are within the scope of the following claims.

What is claimed is:

1. A method performed by one or more computers programmed to enhance images, the method comprising:
  receiving an image and a face region associated with the image;
  sampling pixels from the face region;
  generating, based on the sampled pixels, a face-region evaluation, comprising:
    identifying a skin tone portion in the face region; and
    performing the face-region evaluation only on the skin tone portion,
      wherein the face-region evaluation comprises:
        converting the sampled pixels in the identified skin tone portion to a normalized red-green color space; and
        calculating a mean color of the converted pixels;
  identifying a modification to the image based on the face-region evaluation, wherein the modification comprises:

projecting the mean color onto a point of a focus-to-focus centerline of a predetermined skin tone region having a shortest distance in red-green color space to the calculated mean color; and adjusting the image so that the sampled pixels in the skin tone portion have a new mean in red-green color space equal to the point; and modifying the image in accordance with the identified modification.

2. The method of claim 1, wherein the image comprises an overall image and the face region comprises a face image that is separate from the overall image.

3. The method of claim 1, further comprising:
sampling pixels from the image; and
generating, based on the sampling of the image, an overall evaluation of the image.

4. The method of claim 3, wherein identifying the modification comprises identifying based on the overall evaluation and the face-region evaluation.

5. The method of claim 3, wherein the face-region evaluation and the overall evaluation comprise histograms.

6. The method of claim 5, wherein the histograms correspond to luminosity, saturation and brightest color component of the image and the face region.

7. The method of claim 1, wherein the predetermined skin tone region comprises a polygonal region in red-green color space representing ideal face colors.

8. The method of claim 1, wherein the predetermined skin tone region is defined empirically by analyzing a plurality of images that have been adjusted for proper facial coloring.

9. A computer program product, tangibly encoded on a non-transitory computer-readable medium, operable to cause data processing apparatus to perform operations comprising:
receiving an image and coordinates defining a face region of the image;
sampling pixels from the face region of the image;
generating, based on the sampled pixels, a face-region evaluation, comprising:
identifying a skin tone portion in the face region; and
performing the face-region evaluation only on the skin tone portion, wherein the face-region evaluation comprises:
converting the sampled pixels in the identified skin tone portion to normalized red-green color space; and
calculating a mean color of the converted pixels;
storing the face-region evaluation;
identifying a modification to the image based on the face-region evaluation, wherein the modification comprises:
projecting the mean color onto a point of a focus-to-focus centerline of a predetermined skin tone region having a shortest distance in red-green color space to the calculated mean color; and
adjusting the image so that the sampled pixels in the skin tone portion have a new mean in red-green color space equal to the point; and
modifying the image in accordance with the identified modification.

10. The computer program product of claim 9, wherein the image represents physical objects and comprises binary data displayable by data processing apparatus.

11. The computer program product of claim 9, the operations further comprising:
sampling pixels from the image; and
generating, based on the sampling of the image, an overall evaluation of the image.

12. The computer program product of claim 11, wherein identifying the modification comprises identifying based on the overall evaluation and the face-region evaluation.

13. The computer program product of claim 11, wherein the face-region evaluation and the overall evaluation comprise histograms.

14. The computer program product of claim 13, wherein the histograms correspond to luminosity, saturation and brightest color component of the image and the face region of the image.

15. The computer program product of claim 9, wherein the predetermined skin tone region comprises a polygonal region in red-green color space representing ideal face colors.

16. The computer program product of claim 9, wherein the predetermined skin tone region is defined empirically by analyzing a plurality of images that have been adjusted for proper facial coloring.

17. A system comprising:
a display device for displaying an image enhancement application;
an input device for receiving input from a user of the image enhancement application;
memory; and
data processing apparatus including one or more computers operable to interact with the display device, memory and the input device, and to perform operations comprising:
executing the image enhancement application;
receiving, in memory, an image and coordinates defining a face region of the image;
sampling pixels from the face region of the image;
generating, based on the sampled pixels, a face-region evaluation, comprising:
identifying a skin tone portion in the face region; and
performing the face-region evaluation only on the skin tone portion, wherein the face-region evaluation comprises:
converting the sampled pixels in the identified skin tone portion to a normalized red-green color space; and
calculating a mean color of the converted pixels;
storing the face-region evaluation in memory;
identifying a modification to the image based on the stored face-region evaluation, wherein the modification comprises:
projecting the mean color onto a point of a focus-to-focus centerline of a predetermined skin tone region having a shortest distance in red-green color space to the calculated mean color; and
adjusting the image so that the sampled pixels in the skin tone portion have a new mean in red-green color space equal to the point; and
modifying, in memory, the image in accordance with the identified modification.

18. The system of claim 17, wherein the image represents physical objects and comprises binary data displayable by data processing apparatus on the display device.

19. The system of claim 17, the operations further comprising:
sampling pixels from the image; and
generating, based on the sampling of the image, an overall evaluation of the image.

20. The system of claim 19, wherein identifying the modification comprises identifying based on the overall evaluation and the face-region evaluation.

21. The system of claim 19, wherein the face-region evaluation and the overall evaluation comprise histograms.

22. The system of claim 21, wherein the histograms correspond to luminosity, saturation and brightest color component of the image and the face region of the image.

23. The system of claim 17, wherein the predetermined skin tone region comprises a polygonal region in red-green color space representing ideal face colors.

24. The system of claim 17, wherein the predetermined skin tone region is defined empirically by analyzing a plurality of images that have been adjusted for proper facial coloring.

* * * * *